(No Model.)
H. C. MEYER.
Water Closet.
No. 237,036.             Patented Jan. 25, 1881.
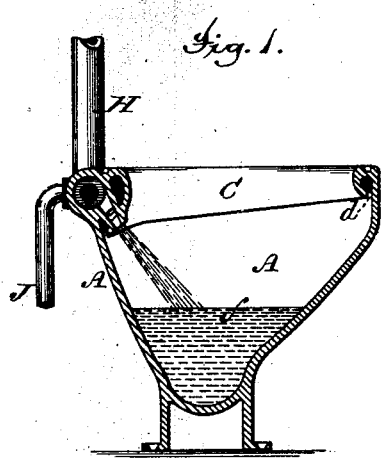
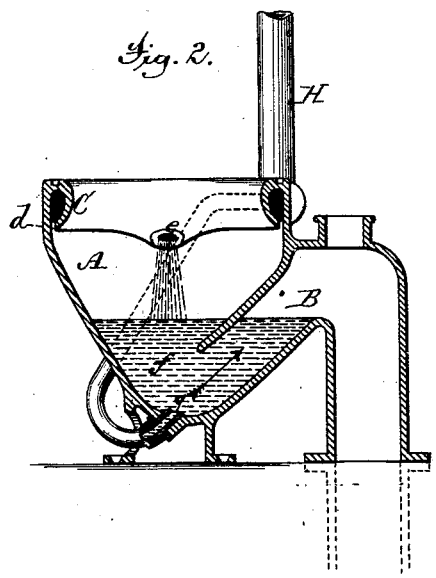
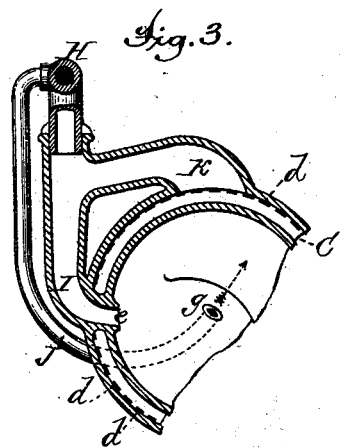

United States Patent Office.

HENRY C. MEYER, OF NEW YORK, N. Y.

WATER-CLOSET.

SPECIFICATION forming part of Letters Patent No. 237,036, dated January 25, 1881.

Application filed November 30, 1880. (No model.)

*To all whom it may concern:*

Be it known that I, HENRY C. MEYER, of New York city, in the county of New York and State of New York, have invented certain new and useful Improvements in Water-Closets; and I do hereby declare that the following is a full and exact description thereof, reference being had to the accompanying drawings, making part of this application.

My invention relates to a new and useful improvement in that kind of water-closets in which a bowl or basin is employed connected at the bottom with a trap, and in which a given quantity of water stands in the bowl and connected trap, to form a water-seal, known, usually, by the general term "hopper-closets." Previous to my invention this kind of closet has been made, in some cases, with an ejector-like water-nozzle or supply-pipe, entering the hopper at its bottom, and designed and operating to inject a stream of water in such manner as to force the contents of the bowl (after use of the closet) up the ascending leg of the trap, and thus facilitate and insure a complete discharge through the trap of the bowl's contents. In other cases this kind of water-closets has been made with one or more nozzles or water-inlets, designed and operating to throw one or more jets directly down (from the upper part of the bowl) onto the standing water and other contained material at the time of flushing the hopper, for the designed purpose of forcing downward and into the ascending leg of the trap the bowl's contents; but in practice neither of these principles of construction of this kind of closets usually induces to perfection of action, because the head of water is not usually sufficient, and in closets made both ways there is more or less liability of the paper and other light substances thrown into the hopper to float against and adhere to the walls of the hopper, instead of being washed away into the trap at the time of flushing the closet.

As those skilled in the art well understand, it is necessary to have the ascending leg of the trap in this kind of closet comparatively long, in order to get a sufficient amount of standing water in the hopper, and the longer this leg of the trap may be the larger the quantity of (or the higher the level at which) the water held in the bowl will be, it being most desirable, of course, to have the quantity as great or the level as high as possible; but just in proportion to the extent to which this advantage is gained is the difficulty encountered of an incapacity of the flushing devices, or means of discharging the bowl of its contents, to force downward into, and then upward through, the ascending leg of the trap, all the paper, water, and other material usually contained in the bowl.

My invention has for its main object to provide means for the certain discharge from the bowl of all contained materials, be they light or heavy, while at the same time the ascending leg of the trap is so long as to permit the retention in the bowl of the maximum amount of water to prevent the possibility of any soiling of the walls of the bowl when the closet is used; and to this main end and object my invention consists in the combination, with the hopper, provided with the usual trap, of means for throwing a jet or jets of water (cascade fashion) onto the standing water in the bowl, to sink any light material therein, and also with a water-supply pipe or other means adapted to throw in a jet or jets of water at or near the bottom of the standing water, to force the contents of the bowl up the ascending leg of the trap, the water jet or jets for sinking or forcing downward any floating material in the bowl, and the ejector-like jet or jets for forcing the contents of the bowl up the ascending leg of the trap, operating about simultaneously and in a co-operative manner to insure the complete discharge from the bowl and up through the ascending leg of the trap of the entire contents of said bowl, all as will be hereinafter more fully explained.

To enable those skilled in the art to make and use my invention, I will now proceed, to more fully describe it, referring by reference-letters to the accompanying drawings, forming part of this specification, and in which—

Figure 1 is a vertical central section of a hopper and its attachments having my invention embodied therewith. Fig. 2 is another vertical section, taken in a plane transverse to the plane of section of Fig. 1; and Fig. 3 is a partial horizontal section at line $x\,x$, Fig. 1.

In the several figures the same part will be found designated by the same letter of reference.

A is the hopper or bowl of the closet, made of about the usual most approved form, and provided with a trap-like portion, B, preferably made integral with the bowl, in which and the bowl a supply of water always stands, in the manner and for the purposes well understood. I have indicated this water in the drawings by broken-line shading at $f$.

C is the usual flushing-rim, from a series of small apertures, $d$, in which numerous small jets of water are discharged onto the walls of the bowl, near its top, to wash down the latter, in the manner well known to those skilled in the art.

At $e$ is a water-supply nozzle or discharge-orifice, designed and adapted to discharge a jet of water (cascade fashion) directly onto the pool of standing water at $f$, and at $g$ is another supply-nozzle, designed and adapted to throw, at the proper time, a jet of water in the direction indicated by the arrow at Fig. 1—that is, in a direction about coincident with a line situated centrally or axially of the ascending pipe-like leg of the trap portion B. Each of the supply-jets at $e$ and $g$, as well as the water for the flushing-rim C, may be derived from the usual source, and preferably is derived through a branch pipe, the several branches I J K being connected to the water-supply pipe H.

The operation will be understood to be about as follows: The closet being supposed to be in its normal condition, with a maximum amount of standing water at $f$, the water is turned on, after a use of the closet, in the usual manner, and simultaneously, or about simultaneously, the main discharging-jet, rushing in at $g$, operates somewhat after the fashion of an ejector, to induce or assist the upward flow or rush of the water, &c., through the ascending leg of the trap B, (which now, by the sudden influx of water and overflow of the trap, becomes the short leg of a siphon,) while the cascade jet (or jets) from the nozzle $e$ operates to insure a deluging and sinkage of any paper and other floating materials in the pool at $f$, and in this manner, by the conjoint effects of the sinking-jet and the force of the discharging-jet, from $g$, are the standing-water, and all substances therein contained or floating on the surface thereof, caused to enter the lower end of and be forced up through the ascending leg of the trap.

Of course, if found expedient, more than one of the sinking or cascade jet nozzles or devices $e$ may be employed, and possibly, in some cases, it might be deemed expedient to have a series of jet-discharging devices at $g$, the streams of which would be all directed toward the center of the tubular ascending leg of the trap B.

I prefer, in carrying out my invention, (in any of the forms in which it may be practiced,) to have the nozzles through which the various jets are to be discharged formed of metal and properly applied to the bowl A, (which is usually made of porcelain or earthenware,) because in this manner they can be made to give the proper direction to the streams or jets with more certainty in the manufacture than is possible if it be attempted to mold or cast the orifices or nozzles integral with the bowl.

It will be seen that by the principle of construction I have devised, in which both the means for sinking and deluging all floating substances and the means for forcing or assisting the ascent of the water, &c., up the trap-leg, I am enabled to insure the complete discharge from the bowl of all its contained materials.

It is desirable, I think, to employ, in connection with the sinking and discharging jets, a "flushing-rim" to insure a perfect washing of the walls of the bowl; but the presence of this device is, of course, not essential to the invention made by me, since it may be omitted, or have some other means for washing down the walls substituted for it, without affecting or changing the result due to the conjoint action of the other devices.

The nozzle at $g$ should supply the larger and stronger current or jet of water, and the sizes and relative capacities of the various water-supplying nozzles or orifices must, of course, be varied according to the size and shape of the closet, and other surrounding circumstances, and in the discretion of the constructer.

Having now so fully described the construction and operation of my improved water-closet that any skilled manufacturer can make the same, what I claim as new, and desire to secure by Letters Patent, is—

The combination, with the usual bowl, A, and trap portion B, of means for supplying a jet or column of water which will be injected at or near the bottom of the bowl and toward the center of the ascending leg of the trap, and means for supplying a jet or jets of water which descend directly into and toward the middle of the standing water, substantially as described, all in substantially the manner and for the purpose set forth.

In witness whereof I have hereunto set my hand this 27th day of November, 1880.

HENRY C. MEYER.

In presence of—
M. H. DILLENBECK,
JACOB FELBEL.